(12) United States Patent
Dejmek et al.

(10) Patent No.: US 8,563,060 B2
(45) Date of Patent: Oct. 22, 2013

(54) METHOD FOR THE CONSERVATION OF A PLANT MATERIAL

(76) Inventors: Petr Dejmek, Malmö (SE); Ingegerd Sjöholm, Lund (SE); Federico Gómez Galindo, Dalby (SE); Pui Yeu Phoon, Lafayette, IN (US)

( * ) Notice: Subject to any disclaimer, the term of this patent is extended or adjusted under 35 U.S.C. 154(b) by 324 days.

(21) Appl. No.: 12/733,974

(22) PCT Filed: Oct. 3, 2008

(86) PCT No.: PCT/SE2008/000541
§ 371 (c)(1),
(2), (4) Date: Apr. 1, 2010

(87) PCT Pub. No.: WO2009/045144
PCT Pub. Date: Apr. 9, 2009

(65) Prior Publication Data
US 2010/0227030 A1    Sep. 9, 2010

(30) Foreign Application Priority Data
Oct. 4, 2007 (SE) ................................. 0702223

(51) Int. Cl.
*A23L 3/32* (2006.01)

(52) U.S. Cl.
USPC ............ 426/237; 426/239; 426/281; 426/327

(58) Field of Classification Search
CPC ........................................................ A23L 3/32
USPC ............. 426/244, 235, 239, 72, 74, 321, 531, 426/565, 385, 524, 615, 237, 281, 327
See application file for complete search history.

(56) References Cited

U.S. PATENT DOCUMENTS
2,702,248 A    2/1955   Guadagni
(Continued)

FOREIGN PATENT DOCUMENTS
EP    0266141        5/1988
JP    2007-195467    8/2007
(Continued)

OTHER PUBLICATIONS

Katkov (2002) "Electroporation of cells in applications to cryobiology: summary of 20-year experience" Problems of cryobiology, No. 2, pp. 3-8.
(Continued)

*Primary Examiner* — Steven Leff
(74) *Attorney, Agent, or Firm* — Harness, Dickey & Pierce, P.L.C.

(57) ABSTRACT

The invention relates to a plant food material comprising at least one cryoprotective agent present in the intracellular space of the cells of said plant. The invention also relates to a freezing method for a plant food product comprising the steps of; providing a plant food material comprising at least 70% water, applying a pulsed electrical field to said plant food material, adding a cryoprotective agent to said plant food material, applying a pressure to said plant food material followed by, a resting period of at least 30 minutes and freezing said plant food material. Thereby it is for the first time possible to conserve a plant food material and maintaining the texture as well as the taste of the plant food material.

16 Claims, 2 Drawing Sheets

(56) References Cited

U.S. PATENT DOCUMENTS

| | | |
|---|---|---|
| 5,118,792 A | 6/1992 | Warren et al. |
| 6,368,784 B1 | 4/2002 | Murray .................. 435/1.3 |
| 6,395,467 B1 | 5/2002 | Fahy et al. |
| 2003/0031998 A1 | 2/2003 | Kadkade |
| 2006/0110504 A1* | 5/2006 | Pelletier .................. 426/239 |
| 2008/0241315 A1* | 10/2008 | Kalum et al. .................. 426/10 |

FOREIGN PATENT DOCUMENTS

| | | |
|---|---|---|
| WO | WO 9013571 | 11/1990 |
| WO | WO 03/055320 | 7/2003 |
| WO | WO 2006/121397 | 11/2006 |

OTHER PUBLICATIONS

Pavlin (2007) "Electroporation in dense cell suspension—Theoretical and experimental analysis of ion diffusion and cell permeabilization" Biochimica et Biophysica Acta 1770:12-23.

Shirakashi, et al. (2002) "Intracellular delivery of trehalose into mammalian cells by electropermeabilization" J. Membrane Biol. 189:45-54.

Shirakashi, et al. (2003) "Effects of physiological isotonic cryoprotectants on living cells during the freezing—thawing process and effects of their uptake by electroporation: Sp2 cells in alginate—trehalose solutions" Heat Transfer—Asian Research 32:6.

European Search Report dated Mar. 31, 2011.

International Search Report, p. 1-8.

* cited by examiner

Fig 1

Fig 2

METHOD FOR THE CONSERVATION OF A PLANT MATERIAL

FIELD OF INVENTION

The invention relates to a plant food material comprising at least one cryoprotective agent present in the intracellular space of the cells of said plant. The invention also relates to a freezing method for a plant food product comprising the steps of; providing a plant food material comprising at least 70% water, applying a pulsed electrical field to said plant food material, adding a cryoprotective agent to said plant food material, applying a pressure to said plant food material followed by, a resting period of at least 30 minutes and freezing said plant food material. Thereby it is for the first time possible to conserve a plant food material and maintaining the texture as well as the taste of the plant food material

BACKGROUND OF INVENTION

A great number of different techniques are available to preserve plant foods to provide a more enjoyable or healthier eating experience for humans or animals. The enhancement may include a variety of modification of plant food properties such as, for example, the enhancement or maintenance of flavour, texture, moisture, color, nutrition value and/or appearance.

Freezing has been unsuitable in cold chain management for a wide-range of plant foods. When thawed, these plant foods may loose texture as well as taste, and sometimes also loose water, which results in a food product far from the common notion of freshness. Certain fruits and vegetables having a high water content, wherein said water upon freezing creates crystalles, which later on when the plant material is thawed the plant material collapse. Structural damage occurs due to disruption of cells following the formation of ice crystals. Loss of color, texture and structural integrity are thus common on thawing. This result in an unsightly appearance of the freeze-thawed fruit and vegetables, detracting from its market value, and may also involve the loss of nutrients etc.

From the literature methods for the treatment of plant foods are known, for example the following.

EP0266141 discloses a method of minimising the texture instability of a food product which comprises impregnating the interstitial and/or intracellular spaces of the food with a gellable colloid solution using vacuum infusion or pressure injection. After infusion the gel is allowed to gel.

US2006110504 discloses a method of enhancing food properties by electroporating a food using electrical pulses. The pulses are high-voltage pulses, and the food contains cells that become permeable from the electroporation. The food is exposed to food agents, which diffuse into the food's cells of the food to enhance properties of the food, wherein the electric potential gradients in a food will be about 700 V/cm. The improvement concerns tenderness, taste, flavor and texture.

However, it is desirable to have an improved method for enhancing the properties of plant food, and also food products with enhanced properties.

SUMMARY OF THE INVENTION

The invention relates to an improved plant food material, wherein said improvement gives rise to the possibility to preserve the plant material freezed and wherein the plant food material upon thawing remain the texture as well as taste, i.e., the plant food material is tolerant against freezing. Crystallisation, being involved in membrane damage, a reduced water-holding capacity, loss of nutrients, lipid oxidation as well as formation of off-flavours. Influences, which upon thawing give rise to a plant food material, having among others an unpleasant taste and texture.

In a first aspect the invention relates to a plant food material comprising at least one cryoprotective agent present in the intracellular space of the cells of said plant. The plant food material will remain a pleasant taste as well as texture after being freezed down and thawed up.

In a second aspect the invention relates to a freezing method for a plant food product comprising the steps of; providing a plant food material comprising at least 75% water, applying a pulsed electrical field to said plant food material, adding a cryoprotective agent to said plant food material, applying a pressure to said plant food material followed by a resting period of at least 30 minutes and freezing said plant food material.

Further advantages and objects with the present invention will be described in more detail in the detailed description of embodiments of the invention.

BRIEF DESCRIPTION OF THE DRAWINGS

FIG. 2 shows the recovery of the spinach leaves subjected to Pulsed electric fields (PEF). The "y" axis is a representation of the conductivity of the tissue. When PEF strikes the spinach leaves (arrow), opening of pores in the membrane makes cell content to leak, increasing tissue conductivity. The conductivity comes back to the original value after some minutes, indicating that the cells are recovering. During this recovery process, the cells will uptake the liquid that they have lost. The figure also shows that, in our experiments, leaves with a high initial electrical resistance did not have the capacity for recovery. These leaves did not survive the freezing/thawing cycle, underlying the importance of the recovery process for the success of our procedure for providing freezing tolerance to the leaves.

DETAILED DESCRIPTION OF EMBODIMENTS OF THE INVENTION

The invention relates to an improved plant food material being tolerant to freezing, i.e., remaining a pleasant taste as well as texture upon being freezed and thaw out.

The new invented plant food material comprising at least one cryoprotective agent present in the intracellular space of the cells of said plant. Said cryoprotective agent(s) is/are selected from the group consisting of carbohydrates and cryoprotectives proteins.

The term "cryoprotective agent" is intended to mean an agent, which protects the plant material upon freezing in such a way that the taste as well as the texture of the plant material remains pleasant. The cryoprotective agent may also be an anti-freeze protein as long as it acts to prevent that a plant food material upon being freezed and the thaw out gets a bad taste as well as an unpleasant structure. Said cryoprotective carbohydrates may be selected from the group consisting of sucrose, trehalose, maltose and lactose as well as it may be an antifreeze protein. There may also be a mixer of cryoprotective agents and anti freeze proteins. Non limiting examples of cryoprotectants are cryoprotecting proteins, trehalose, glucose and other sugars, glycols and other alcohols containing at least two hydroxyl groups and dimethyl sulfoxide.

One example being trehalose. Trehalose, being only 45% as sweet as sucrose, is not likely to influence the taste of the plant tissue adversely. Furthermore, the high process stability of trehalose, due to its unique chemical structure, suggests that it might not be likely to degrade, during the process of bringing it into the plant tissue. Other advantages of trehalose are its water holding properties, non-toxicity, strong vitrifying properties, protein and membrane protective properties and anti-oxidative properties.

The term "antifreeze protein, AFP" being a cryoprotective agent relates to proteins which are produced by certain vertebrates, plants, fungi and bacteria. Antifreeze proteins bind to small ice crystals to inhibit growth and recrystallization that would otherwise be fatal. Non-limiting examples of anti freeze proteins are fish AFP such as antifreeze glycoproteins and type I-IV AFP, insect AFP such as type V AFP and plant AFPs.

The concentration of the cryoprotective agent in the solution may be selected to any appropriate concentration depending on the agent to be used, the plant tissue to be treated, the different electric fields and other processing parameters used. As an example, the concentration of trehalose in the solution may be in the range of about 10-60% w/w, such as about 20-50% w/w such as about 40% w/w. Other examples include 10-15%, such as 11, 12, 13 or 14%. Other examples includes a mixture of trehalose and an anti freeze protein (AFP), wherein the trehalose is present in an amount of about 10-15% w/w and the AFP in 0.03-0.5%, such as trehalose in an amount of 12% and AFP in an amount of 0.2%.

The Plant Material

The plant food material also called plant tissue for which it is possible to protect against loosing the structure upon freezing being a plant food material comprises at least 70% (w/w) of water. For example, 71%, 72%, 73%, 74%, 75%, 80%, 85%, 90% or 95% (w/w) of water. Water, which forms crystals upon being freezed which destroys a number of components in the plant material including the membranes. Examples of plant food materials are is fruits, berries, vegetables, herbs, tubers and grains, all having a high water content. Specific examples are spinach, salad, strawberry, raspberry, apple, mango, papaya, guave, banana or blackberry.

The term "intracellular spaces" means the space inside the cell membrane of the cells of the plant tissue. The intracellular space is normally filled with water comprising salts and other ingredients.

The term "extracellular spaces" means the space outside and between the cells of the plant tissue. These spaces are normally filled by a liquid, but may in plant tissues be at least partially filled with air or gas.

The Method

In another aspect the invention relates to a method to obtain the plant food material as defined above, wherein it has been unexpectedly found that the combination of a pulsed electric field treatment, i.e., electroporation, on a plant food material in combination with vacuum or pressure treatment may effectively enhance the transfer of a cryoprotective agents into the intracellular spaces of the plant material/tissue, wherein there is a resting period of at least 30 minutes prior to that the plant food material is freezed.

Plant materials as defined above have a high water content which will form crystals upon being freezed which changes the taste as well as the structures of the plant membrane and the plant food material collapse. By combining a controlled pulse electrical field (PEF) with vacuum infiltration (VI) it is for the first time to obtain a cryoprotectant solution inside the cells of the plant material and thereby substantially improve the plant materials freeze tolerance.

The plant tissue may be prepared by slicing or dicing according to their size and nature before being subjected to the method of embodiments of the invention.

The plant tissue may be introduced to the solution comprising the cryoprotective agent in different ways, such as by way of examples, immersion of the plant tissue in the solution, spraying a solution onto the plant tissue or dipping the plant tissue in the solution. The solution may be a solution of a high or low viscosity or even a gel-like solution.

Applying a Vacuum or Pressure

The method according to an embodiment comprises the step of applying a vacuum or pressure to the plant tissue.

By applying a vacuum or pressure the volume of air normally present in the extracellular spaces of the plant tissue may be reduced. This volume of air may be replaced by a solution containing a cryoprotective agent as defined above.

One non limiting example of how to introduce the cryoprotective agent in a solution to the extracellular spaces of the plant material/tissue is a process called vacuum infusion. By the term "vacuum infusion" is hereby meant a process where the amount of air in the extracellular spaces of a tissue is lowered by the application of a vacuum followed by introducing a solution comprises the cryoprotective agent when the external pressure is restored.

Vacuum infusion may also be called vacuum impregnation or vacuum infiltration.

The process of vacuum infusion may be carried out when the plant tissue is immersed in a solution containing at least one cryoprotective agent as defined above. In this way the solution can immediately fill the extracellular spaces.

Another non limiting example of how to introduce the cryoprotective agent into the extracellular spaces of the plant tissue is a process called pressure impregnation. By the term "pressure impregnation" is hereby meant a process where the volume of air in the extracellular spaces of a tissue is lowered by the application of a pressure in combination with the introduction of a cryoprotective agent in a solution which is forced into the spaces by pressure. The process of pressure impregnation may be carried out when the plant tissue is immersed in a solution containing a cryoprotective agent.

The process of pressure impregnation may be carried out when the plant tissue is immersed in a solution containing a cryoprotective agent. In this way the solution can immediately fill the extracellular space.

The vacuum or pressure may be applied in from about 30 seconds to about 60 minutes once or repeatedly. The holding time of the applied vacuum depends on the plant tissue and on the cryoprotective agent solution to be used in the method. Larger pieces of tissue may need a longer holding time while smaller or thinner pieces of tissue may need shorter holding time. The holding time should lead to maximal de-airing to facilitate maximal replacement by the cryoprotective agent in a solution. Examples of time periods include 1-30 minutes, such as 5-15 minutes.

The pressure or vacuum may be applied by any known means. There are many available relatively inexpensive devices which may be used in the method.

The vacuum infusion process will vary for each particular plant tissue depending on geometry and cellular structure. A low level of vacuum may be used with high surface area to volume ratio plant tissue and on plant tissue with high permeability. The tissue may be disrupted by a too fast rate of application of vacuum or pressure. The vacuum to be applied may be in a range from about 0.01 atm to about 0.5 atm, such as 0.05, 0.1, 0.2, 0.3, 0.4 atm (0.01 atm=1 kPa) By way of example, strawberries have a small surface area to volume ratio and have a cellular structure which has a low conductivity to impregnation. In this particular case a higher vacuum may be required.

The plant tissue may be peeled and cut into pieces in order to enhance the process.

Applying an Electrical Field to the Plant Tissue

The method according to one embodiment comprises the step of applying an electrical field to the plant tissue. The electrical field may be applied before, after or concurrently with the application of a vacuum. By applying an electrical field, electroporation may be achieved resulting in the opening of pores or other mass transfer paths in the cell membranes of the cells in the plant tissue. These openings may be used for movement of material into and/or out of the cells. The openings may be transient (Le. reversible electroporation), but in many applications of electroporation the electroporation is irreversible. Reversible electroporation is a prerequisite for cell viability. In the method according to one embodiment of the invention, the electrical field is applied in a way leading to reversible electroporation.

The electric potential may be applied in pulses (Pulsed Electric Field, PEF), in form of bipolar or monopolar pulses. The form of the pulses may be rectangular, exponential, oscillatory or instant-charged reverse pulses. A bipolar rectangular pulse may be used, these pulses are energetically effective and the regular reversal of polarity exerts a stress in the cell membrane, enhancing the electroporation.

Factors to consider in determining suitable electrical field conditions may include electrical properties associated with the electroporation such as the following: electric field strength, pulse duration, pulse number, and pulse frequency. Other factors may include physical and/or chemical properties of the plant tissue to be electroporated such as one or more of the following: volume, water content, pH, temperature, and conductivity.

When treating the plant tissue according to an embodiment, the electrical field conditions are selected in order to achieve a plant tissue with a majority of cells in a viable state. Harsh electrical field conditions often used in the prior art are not applicable since they may lead to cell death.

Further, the treatment conditions of the electrical field may be chosen so that a reversible electroporation of at least a portion of the cells is achieved. Whether the pore formation is reversible or irreversible depends on parameters such as the amplitude, length, shape and repetition rate of the pulses in addition to the type of cell and tissue.

Any known means or devices may be used in order to achieve the electrical field according to the embodiments. The specific characteristics of the electrical field may be selected depending on the plant tissue to be treated.

The strength of the electrical field may be in a range from about 0.010 to about 10 kV/cm, such as from about 100 to about 600 kV/cm. For example 200, 300, 400, 500 or 580 kV/cm. A too strong electrical field may cause cell death and a too weak electrical field does not cause a poration. The choice of strength may depend of factors such as cell size and how fast you want to achieve an effect.

The length of the rectangular pulses may be in a range of from about 0.001 to about 1 ms. The longer pulse the more time there is in charging the membrane and encouraging permeabilisation, though at the possible expense of a suffering in the capacity of the membrane to reseal/recover.

The pulsed electrical field may be applied in the form of about 2 to about 1000 pulse trains separated by about 0.1 to about 100 seconds interval(s). By dividing the treatment duration, thermal effects may be minimised. A high number of pulse trains might infer slower resealing, or longer resealing and memory effect stages. This could allow a longer time available for mass transport across cell membranes in considerable distances, and encourage greater uptake of solution. However, too long treatment time with many pulse trains may lead to excessive solute leaching and irreparable physiological damage.

The period length of the pulse trains may be selected in the range of about 0.1 to about 1000 ms. The shorter the duration of the pulse trains are, the more efficiency there is in achieving the same extent of permeabilisation in the membrane, although the eventual peak permeabilisation would be lower, compared to use of longer pulse trains. A cell which encounters a smaller extent of permeabilisation might have greater capacity to reseal and recover in a shorter time. This would be an issue of contemplation during vacuum or pressure treatment, the time it would take for the agent in the solution to reach the extracellular space, before it could be taken up by the cells during the 'memory effect' stage.

The interval between two consecutive pulses may be selected from about 1 µs to about 10 s, whatever is appropriate for the specific plant tissue to be treated.

Combination of Electrical Field Treatment and Application of Vacuum or Pressure

In a method according to one embodiment plant tissue is treated with a combination of an electrical field treatment and vacuum or pressure treatment. This treatment has resulted in unexpectedly good results with a high penetration of an agent into the cells of the plant tissue. With the method all the cells of the tissue will be treated in a homogenous way regardless the thickness of the plant tissue to be treated.

In a method according to one embodiment the electrical field is applied in a step preceding the application of a vacuum or pressure. By this treatment continuous cellular uptake may be achieved by electroendocytosois in the time scale of minutes to hours with the transmembrane gradient of the agent serving as an inductive factor.

This method may be useful for plant tissues which are physiologically weak to resist irreversible metabolic changes due to an electric field treatment, such as thin and leafy plant tissues, an example being spinach leafs.

One advantage being that relaxation of the plant tissue after the vacuum or pressure treatment may be taking place simultaneously with cellular recovery from the electrical field treatment, leading to a shorter total treatment time.

In an alternative method according to one embodiment of the invention the vacuum or pressure is applied to the plant tissue in a step preceding the application of the electrical field. By this treatment the solution containing the agent will be introduced into the extracellular spaces first using pressure or vacuum followed by immediate transport into the cells during the electrical treatment leading to a reversible electroporation. This method may be useful for vegetable tissue with small surface area to volume, such as way of example whole strawberries.

Relaxation and Rehydration

After the vacuum or pressure treatment, the plant tissue will be subjected to a further step wherein the plant tissue is left in the solution or out of the solution without energy input or output as mentioned before. This treatment is hereby called "relaxation" or "resting period".

The relaxation may be performed in any appropriate time from about 30 minutes to 5 hours, such as 1, 2, 3 or 4 hours. The relaxation may be performed in the same solution as used in the previously performed treatment. A relaxation may also be performed without a solution with the product positioned in an environment comprising air or inert gas, such as nitrogen, at ambient pressure.

As an alternative or in combination with a relaxation the plant tissue may be subjected to a further step wherein the plant tissue is left in water without energy input or output as mentioned before. This treatment is hereby called "rehydration". By a rehydration the cells of the plant tissue may regain lost water and achieve the turgor of a fresh plant tissue. This treatment may be particularly useful for leafy or thin plant tissues such as for instance spinach.

The rehydration may be performed in a step following the relaxation. The treatment time for rehydration may be from about 60 seconds to about 48 hours.

The steps of relaxation and rehydration may improve the viability, structure, texture, appearance etc. of the plant tissue. The relaxation and/or rehydration may be performed before a subsequent freezing.

Freezing

The plant tissue may be frozen after it has been treated with the electrical field and/or after it has been treated with a vacuum or pressure.

The plant tissue may be frozen to a temperature below about −10 C by any suitable available means. Non limiting examples are conventional freezers, immersion in liquid nitrogen, air blasting or high pressure freezing. A conventional freezer temperature of about −18° C. may be used as well as other freezing means with temperatures below about −20° C. such as below −30° C., 40° C. or below −50° C.

The means for freezing the plant tissue and the freezing rate may be chosen depending on the specific tissue to be treated.

While further modifications and improvements may be made without departing from the scope of the invention, the following is a description of one or more examples of the invention. The examples are intended to illustrate, but not to limit, the invention in any manner, shape, or form, either explicitly or implicitly.

EXAMPLES

Example 1

Sample Preparation

Fresh spinach leaves were bought from the ICA supermarket branches in Lund, Sweden, in the form of 150 g sealed packets. The samples originated from Sweden, the Netherlands, Italy and Spain. The packets were placed on the vegetable chilling shelves in the supermarkets. After purchase, they were stored in a cold room (chilling environment with temperature kept at 4-8° C.). The leaves in a packet were used within their shelf life, which was 3-7 days before the expiry date.

Leaf samples, inclusive of the cuticle layers, were of the dimensions 3.0 cm (length)×0.5 cm (width)×[0.05-0.07 cm] (thickness). With a sharp knife blade and a card template of 3.0 cm (length)×0.5 cm (width), a sample was cut out from a leaf (the circular samples were cut out using an apple core borer of diameter 1.5 cm). To ensure that the thickness of each leaf sample was even, the thickness was measured with vernier calipers at 2 to 3 different regions. All leaf samples were taken so that they did not contain any mid-vein/any other protruding vein, so that surfaces were kept as even as possible.

Freezing and thawing was performed as described below in order to find conditions useful in the complete procedure as described above.

Freezing was conducted essentially by a liquid-nitrogen plunge; while to minimise the problem of ice recrystallisation, rapid thawing was achieved by quickly transferring the frozen sample into room temperature water. The tools involved in freezing included two stainless steel electrodes, each with a long plane of 3.6 cm (length)×0.9 cm (width), a big metallic paper clip and forceps. The electrodes were the 'sandwiching barriers'. The paper clip was used to secure the 'sandwich'; the forceps was meant to facilitate the swift dipping of the 'sandwich' into the liquid nitrogen during freezing and into the water during thawing. The sample within the 'sandwich' was handled such that it was not subjected to additional compression.

Vacuum infusion conditions including holding times were analysed as described below in order to find useful conditions to the complete procedure as described above.

The trehalose solution was be prepared at a concentration of maximal solubility, which was 68.9 g/100 g water at 20° C., i.e. approximately 40% w/v. Besides, it was generally perceived to be better to use an solution of high concentration, as there could be a higher tendency for a solution of low concentration to escape the 'opened-up' pores during the relaxation phase of vacuum infusion, thus yielding lower solid gain; whereas for more concentrated solution, it tended not to flow out of the matrix after penetration due to its moderately high viscosity.

The effect of different holding times on the volumetric fraction of penetrated trehalose solution $\phiس$ in leaf (%) was studied. An isotonic sucrose solution (from Sigma) and a hypertonic (~40% w/v) trehalose solution were used for comparison. Vacuum infusion was carried out similarly as above, each time with three to four samples that were pre-weighed collectively. The holding time of vacuum application was tested at 1, 3, 12 and 20 min. The full restoration of atmospheric pressure was followed by a 5 min relaxation period in the same solution. After vacuum infusion and just prior to a second collective weighing of the samples, any solution adhering to the sample surface was quickly wiped off. Subsequently, the samples were dried in the oven at 105° C. overnight, cooled in a dessicator to room temperature and collectively weighed again. Weight differences were used in the determination of solid gain (SG %) and volumetric fraction of penetrated trehalose solution $\phi_s$ in leaf (%).

Eventually, vacuum infusion was conducted in the same way with the determined holding time using ~40% (w/v) trehalose solution, but with a relaxation time which was as long as tissue recovery from the pulsed electrical field treatment required. The net penetration of ~40% (w/v) trehalose solution after the long relaxation time was similarly checked by the combined oven drying and gravitational method, with weight differences being used in the computation of SG (%) and $\phi_s$ (%). To determine the efficiency, the net penetration was compared to the effective porosity of spinach leaf

TABLE 1

Using 11.5° Brix isotonic sucrose solution, Dutch samples

| Holding time (min) | Mean $\phi_s$ in leaf (%) |
|---|---|
| 3 | 21.9 |
| 12 | 22.3 |
| 20 | 22.6 |

TABLE 2

Using 40% w/v trehalose solution, Italian samples

| Holding time (min) | Mean φs in leaf (%) |
|---|---|
| 1 | 4.7 |
| 3 | 3.9 |
| 12 | 3.7 |

TABLE 3

Using 40% w/v trehalose solution, Swedish samples

| Holding time (min) | Mean φs in leaf (%) |
|---|---|
| 12 | 10.1 |
| 20 | 13.0 |

There was no apparent effect of the tested holding time on the extent of penetration of the solution, when isotonic solution was used, see tables 1 to 3. This seemingly implied that equilibrium had been reached during the holding phase of vacuum infusion and that maximal air from the matrix had been removed as quick as within 3 min. However, when the actual hypertonic trehalose solution was used, the mean φs conditioned by 20 min holding time were larger than that conditioned by 12 min holding time. Hence, to set the holding time at 20 min might provide more reliability in ensuring maximal air removal from the sample matrix, in the presence of hypertonic solution.

Electroporation was performed as described below in order to find useful electroporation conditions to be used in the electroporation and vacuum treatment as described above.

A leaf sample was sandwiched, without any bruising incurred, between two stainless steel electrodes, each with a long plane of 3.6 cm (length)×0.9 cm (width). The positioning of the sample was such that no close circuit would be induced during the PEF treatment. Scotch-tape (Scotch® Magic™ tape) layers were taped onto the exterior of the 'sandwich' so as to minimise evaporative water loss from the sample. The electroporator used was CythorLab from Aditus™ and it was programmed by the computer to deliver the pulse treatment. Besides, using a tool in signal processing called maximum length sequence as measuring pulse, Cythorlab was programmed to measure the separate portions of electrical resistance and reactance of the sample at 10 Hz to 100 kHz before, during and after the PEF treatment. This was although only results in the frequency frame of 3-10 kHz would be considered. For measurement, the measuring pulse was set as bipolar with an amplitude of +1A and a wave train length of 131 ms. The speed of sampling/measurement by the pulse was 250 kHz. The suitable combination of PEF process parameters i.e. electric field strength of the bipolar pulses, length of pulse train, duration of pulse width and number of electroporation trains was found by trial-and-error, and then used in the treatment of samples during the actual freezing feasibility test.

The PEF treatment parameters, with 10 s interval between pulse trains, was found to entail the following: (i) 580V/cm field strength; (ii) 0.025 ms pulse width; (iii) 20 ms pulse train and (iv) 10 electroporations (EP) of the pulse train. If only samples with dG % (change in conductance compared to preelectroporation measurement) within 20-45% right after the last EP were considered, the average change in dY % (change in admittance compared to preelectroporation measurement) was as high as 110+%.

Based on preliminary, extensive Microsoft worksheets of the PEF measurement results obtained for five such samples (i.e. subjected to the optimal PEF treatment and having dG % within 20-45% right after the last EP) and the controls (i.e. without application of permeabilising pulses), dY % and dB % (change in susceptance compared to pre-electroporation measurement) were tabulated and in turn plotted as a function of time. After the last electroporation, both dY % and dB % either decreased, or remained at a plateau within 5 min before decreasing. The 25th min mark signified the restoration of atmospheric pressure, as well as the start of hydrodynamic mechanism (HDM) penetration into the leaf matrix due to large pressure gradient. It could be deduced from the trends of the samples, that considerable uptake of extracellular solution would continue after 25 min since the last electroporation. Subsequently after 2.5 h, dY % and dB % returned to the pre-treatment level. This might be a fair indication of a restoration of the original electrolyte constitution of the cells and thus a suggestion of fine physiological recovery. There was no significant increase in dY % and dB % again in these five samples during 8-12 h of further tracking. Based on these observations, a decision for the whole, to-be-optimised treatment procedure was reached: of the samples treated by PEF, only those having dG % within 20-45% right after the last EP would be subjected to further treatment (i.e. vacuum infusion, relaxation, rehydration, etc.).

The refined PEF treatment was also used to treat samples of impedance either higher or lower than the aforementioned five samples. Similarly, from the preliminary worksheets of the PEF results obtained for these samples, dY % and dB % were tabulated and plotted thereafter. The trends revealed that the influence of the intensity of PEF treatment on reversibility was a relative issue, depending on the original impedance of the sample. The same PEF treatment might delay recovery or even cause irreversible electroporation in samples with lower initial impedance. However, in samples with higher initial impedance, the PEF treatment might either lead to full recovery of cells, or interestingly, to significant recovery at first but an increase in solute leaching again at a later time.

Evaluation of the Viability Test, "Angle Test"

In order to evaluate the efficiency of the invention according to the embodiments, the following viability test was used. The final results are depicted above.

A leaf sample was placed at the middle of its flat plane by a toothpick, with the use of another toothpick to keep it in position. The bending of the leaf sample was a function of its turgidity: a living sample would be able to stay horizontally in air whereas a dead sample would pivot on the lower toothpick and hang down on both sides.

The underlying principle of the Angle test was that the cell membrane is the primary site of freeze-induced injury, so if there were any damage incurred during freezing, the cell membrane would lose its integrity, causing the cells to lose turgor and the leaf tissue to lose support for itself.

Example 2

Survival Rate of Treated Spinach, Complete Procedure

Figure 1:
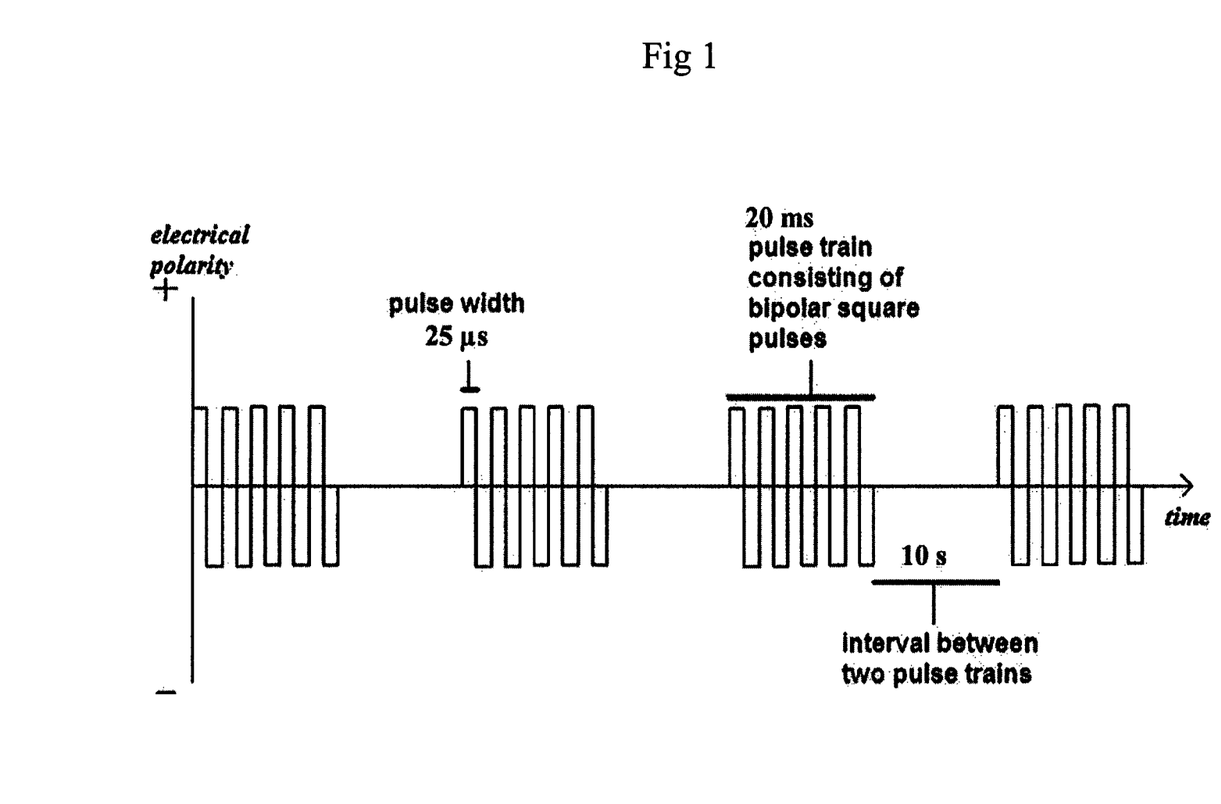
FIG. 1 shows a simplified diagram of the PEF treatment design. Ten trains of bi-polar, rectangular electric field pulses with a nominal electric field strength of 580 V/cm were applied as described in the Section 2. Pulse characteristics are shown in the figure.

The whole procedure of treatment of spinach was performed in order as follows:
1. PEF Treatment
With (i) bipolar waves of 580V/cm electric field strength; (ii) 0.025 ms pulse width; (iii) 20 ms pulse train; (iv) 10 pulse trains separated by 10s interval (see FIG. 1). Only samples having dG % within 20-45% right after the last EP were treated in the subsequent steps.

2. Vacuum Infusion in 40% Trehalose Solution

With (i) a gradual 'come-up' in vacuum within 2 min 5 s to 2 min 55 s; (ii) a holding time of 20 min at −80 to −86 kPa; (iii) a gradual 'come-down' in vacuum within 1 min 30 s to 2 min 15 s.

3. Relaxation

In ~40% (w/v) trehalose impregnation solution for at least 2.5 h.

4. Rehydration

At least 2 h in deionised water for full regain of turgor.

5. Freezing

By liquid nitrogen plunge method for 6 s (Italian samples) and 7 s (Dutch samples).

6. Thawing Immediately after Freezing

In room temperature water.

The results of the controls, with either the omission of PEF, rehydration, or both were as shown in Table 4.

To be stricter in the quest for more reliable results, especially in the assessment of the impact of the PEF treatment, multiple replicates prepared only from Dutch spinach were tested. Two controls were used, i.e. (i) fresh samples frozen and thawed without any prior treatment and (ii) samples treated as in Control 3. For a change, 6s of freezing was used instead of 7s because out of 11 Dutch samples treated under the optimised procedure, only 1 survived the freeze-thaw cycle (i.e. survival=9.1%). Only the portrayal of a near horizontal matrix (without any sign of drooping) was considered acceptable for survival. The results are depicted in table 4.

TABLE 4

Survival rate of treated samples

| | Survival rate, tested by the angle test |
|---|---|
| Control<br>Freeze → Thaw | 3/16 = 18.8%<br>3 samples out of 16 survived the treatment |
| Control<br>VI → Relaxation →<br>Rehydration → Freeze →<br>Thaw | 4/14 = 28.6%<br>4 samples out of 14 survived the treatment |
| PEF → VI → Relaxation<br>→ Rehydration → Freeze<br>→ Thaw | 9/16 = 56.3%<br>9 samples out of 16 survived the treatment |

The survival rate of Dutch samples treated with PEF was significantly twice as that of samples treated by all the steps except PEF. Thus, it could be concluded that there is a positive indication on the feasibility of freezing spinach leaves, when assisted by PEF and VI. The bright green glow from the trehalose made the accordingly-treated samples look attractive just before freezing.

Finally, the storage life of the thawed, successful samples was traced with increasing time. The samples were kept in deionised water at 4° C. The samples could be stored for 7 days after thawing.

Figure 2:
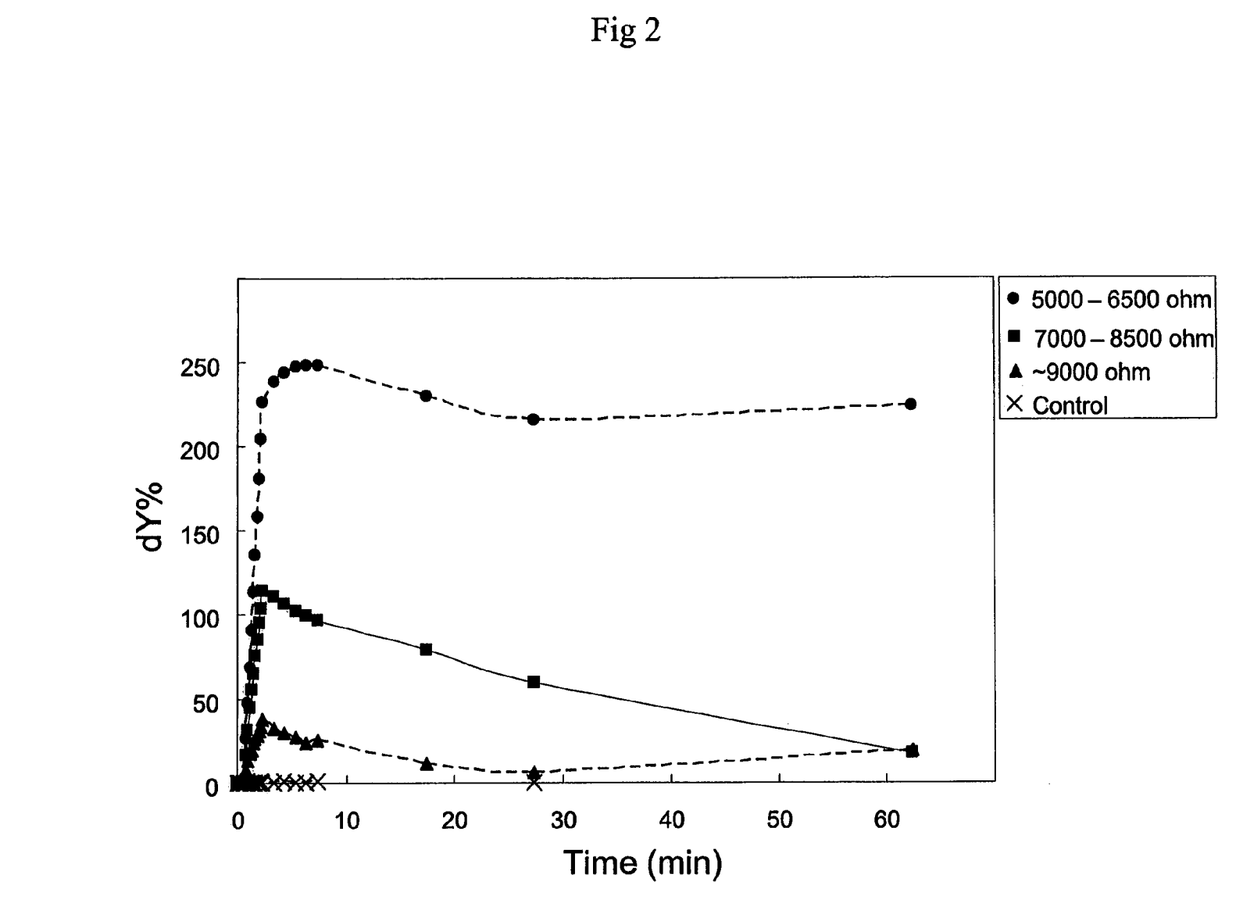

The FIG. 2 shows the results of the recovering of the plant material during the resting period.

Example 3

Treatment of Strawberries

Fresh strawberries (*Fragaria×ananassa*) cv. Salsa were self-plucked at a farm in Lund, Sweden (Höjebromölla bärodling). They were kept at 4° C. before use. During the study, they were sectioned into halves and cut into ~5 mm thick slices, using a sharp blade.

The whole procedure of sample treatment of strawberries was in order as follow:

1. Vacuum Infusion

Immersion of strawberries in 3 different solutions, with (i) a gradual 'come-up' in vacuum within 1.5 min; (ii) a holding time of 5 minutes at −60 kPa; (iii) a gradual 'comedown' in vacuum within 1.5 min.

Solution 1: 12% (w/w) trehalose* (isotonic solution)
Solution 2: 12% (w/w/) trehalose, 0.2% (w/v) anti-freeze protein (AFP) crude extract**
Solution 3: 12% (w/w) trehalose, 0.04% (w/v) AFP crude extract

* The trehalose was from Cargill (C* Ascend 16400).
** The crude extract was spray-dried, unpasteurised wheatgrass juice from Biotech INC, Canada. The AFP concentration was unknown.

2. PEF Treatment

Treatment of the strawberries with bipolar waves of the following characteristics: (i) 200V/cm electric field strength; (ii) 0.025 ms pulse width; (iii) 20 ms pulse train; (iv) 15 pulse trains separated by 10 s interval. Treatment below 4° C.

3. Freezing

The strawberries are sealed within a sealed packet of fitting size and are then frozen by liquid nitrogen plunge method for 20 s.

The tested concept was proven with evidence from samples immersed in solution 2 and 3, which shows that different plant materials needs a little bit different composition of the cryoprotective agents as well as different PEF.

The invention claimed is:

1. A method for preparing a plant food product for freezing, the method comprising:
   a. reversibly electroporating a plant food material comprising at least 70% water (w/w) by applying a pulsed electrical field to said plant food material;
   b. exposing the plant food material to a solution comprising a cryoprotective agent;
   c. applying vacuum or pressure to said plant food material and solution;
   d. allowing the plant food material to rest for at least 30 minutes prior to freezing, to improve viability, structure, texture and appearance of the plant food product and freezing the plant food material after step d.

2. The method according to claim 1, wherein step a is performed before the sequence of step b and step c or step a is performed after the sequence of step b and step c.

3. The method according to claim 1, wherein vacuum is applied in step c.

4. The method according to claim 1, wherein a rehydration step is performed in connection with the resting period or following the resting period.

5. The method according to claim 1, wherein said cryoprotective agent(s) in step b is/are selected from the group consisting of a carbohydrate and a cryoprotective protein.

6. The method according to claim 5, wherein said cryoprotective carbohydrate(s) is/are selected from the group consisting of sucrose, trehalose, maltose and lactose.

7. The method according to claim 5, wherein said cryoprotective agent is an antifreeze protein (AFP).

8. The method according to claim 7, wherein the antifreeze protein is selected from the group consisting of fish AFP, insect AFP and plant AFPs.

9. The method according to claim 8, wherein the fish AFP is selected from the group consisting of an antifreeze glycoprotein and type I-IV AFP.

10. The method according to claim 8, wherein the insect AFP is type V AFP.

11. The method according to claim 5, wherein said cryoprotective agent is trehalose.

12. The method according to claim 5, wherein said cryoprotective agents are trehalose and antifreeze protein.

13. The method according to claim 1, wherein said pulsed electrical field has a field strength of from about 100 to about 600 V/cm.

14. The method according to claim 1, wherein said pulsed electrical field is applied in the form of about 2 to about 1000 pulse trains separated by about 0.1 to about 100 second interval(s).

15. The method according to claim 14, wherein the period length of the pulse trains is selected in the range of about 0.1 to 1000 ms.

16. The method according to claim 1, wherein the plant food product is spinach, strawberry, raspberry; apple, mango, papaya, guava, banana or blackberry.

\* \* \* \* \*